G. W. MARTIN.
NUT LOCK.
APPLICATION FILED DEC. 28, 1911.
1,041,831.
Patented Oct. 22, 1912.
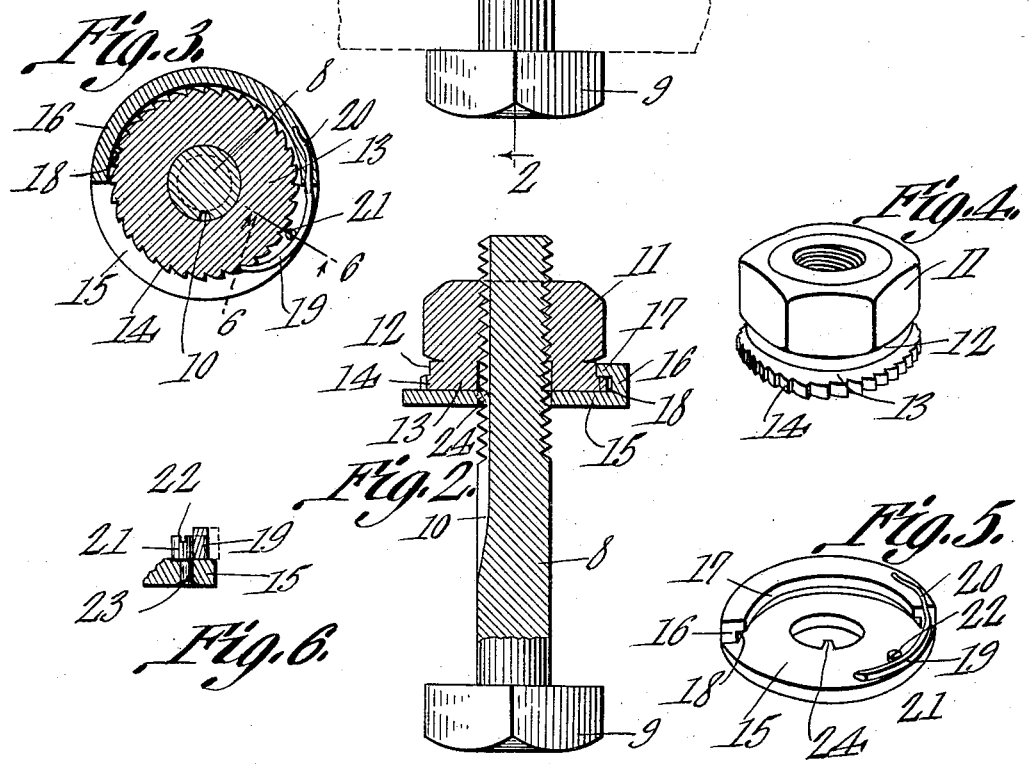
G. W. Martin
Inventor
by C. A. Snow & Co.
Attorneys
Witnesses

UNITED STATES PATENT OFFICE.

GEORGE W. MARTIN, OF CHANNING, TEXAS.

NUT-LOCK.

1,041,831.  Specification of Letters Patent.  Patented Oct. 22, 1912.

Application filed December 28, 1911. Serial No. 668,250.

*To all whom it may concern:*

Be it known that I, GEORGE W. MARTIN, a citizen of the United States, residing at Channing, in the county of Hartley and State of Texas, have invented a new and useful Nut-Lock, of which the following is a specification.

This invention relates to nut locks, and has for its object to provide means for locking a nut at any position upon a bolt against reverse movement, to unscrew same.

It is a further object of the present invention to provide a coöperating nut and washer which are constrained against longitudinal movement relative to each other, the washer being adapted to be constrained against rotation on the bolt to which the nut and washer are applied, and means for preventing the reverse rotation of the nut relative to the washer to remove the nut.

This invention is embodied primarily in a nut and a washer adapted to coöperate to be constrained against longitudinal movement relative to each other on a bolt, and the washer having means for constraining same against rotation on a bolt, and means for preventing the reverse rotation of the nut relative to the washer, as hereinafter described and claimed, reference being had to the accompanying drawings, wherein similar reference characters indicate similar parts, and wherein:

Figure 1 is an elevation of a bolt with the nut and washer applied thereto. Fig. 2 is a sectional view on the line 2—2 of Fig. 1. Fig. 3 is a sectional view on the line 3—3 of Fig. 1. Fig. 4 is a perspective view of the nut. Fig. 5 is a perspective view of the washer. Fig. 6 is a sectional detail on an enlarged scale taken on the line 6—6 of Fig. 3.

Referring specifically to the drawings, 8 designates a bolt of the ordinary type having the head 9 and having a longitudinal groove or channel 10 cut in the periphery thereof.

The nut is designated by the numeral 11, the same being hexagonal and having an annular or peripheral groove or channel 12 cut therein adjacent its inner end forming a collar 13 at the inner end of the nut, the said collar having the ratchet teeth 14 in the periphery thereof.

The washer is designated by the numeral 15, the same having the lug 24 projecting inwardly for engagement in the groove or channel 10 of the bolt 8 to constrain the washer against rotation on the bolt, and also having a concentric extension 16 projecting from the edge thereof, which is undercut as designated by the numeral 18 to form an inwardly projecting lip or flange 17. A spring pawl 19 is secured to one end of the extension 16, one end of the spring pawl 19 being sinuous as designated by the numeral 20 and being embedded in the end of the extension 16 and the free end of the pawl being curved along the edge of the washer 15. The pin 23 is mounted in the washer 15 at a position slightly inset from the pawl 19 and the said pin 23 has an eccentric 21 coöperating with the spring pawl 19, the eccentric 21 having a diametric slot 22 in the outer end thereof for convenience in rotating same.

In use, the washer 15 is brought against the inner end of the nut 11 and the edge of the collar 13 is engaged under the lip or flange 17 of the extension 16 of the washer, the extension 16 being of an arc less than one-half a complete circle to permit the collar 13 to be readily inserted into the undercut portion 18 by a lateral movement, thereby bringing the tap of the nut and the aperture of the washer into registration or coincidence. When the nut and washer are so engaged to each other the same are constrained against longitudinal movement relative to each other, and they are applied to the bolt in this relation with each other. In applying the nut and washer to the bolt, the washer 15 is engaged over the end of the bolt to bring the lug 24 into the end of the groove or channel 10, and the nut and washer are then forced inwardly until the nut engages the end of the bolt, whereupon the nut may be screwed upon the bolt. Normally the free end of the spring pawl 19 engages the ratchet teeth 14 of the collar 13 to prevent the nut from being rotated in a reverse direction to unscrew same from the bolt but permitting the nut to be screwed upon the bolt toward the head of the nut. In this manner the nut 11 is locked at any position upon the bolt 8, for the reason that the same is prevented from reverse rotation relative to the washer 15, the washer being constrained against rotation on the bolt and being carried by the nut to effect this result. This is of advantage for the reason that in many instances it is desirable or necessary that the bolt shall fit loosely through the object or objects to which it is applied. By screwing the nut 11 inward the washer 15 may also be brought tightly against the object to which the bolt is applied, the same as an ordinary washer. By turning the eccentric 21 the free end of the spring pawl 19 may be forced outwardly thereby disengaging the free end of the pawl from the ratchet teeth 14 and thus permitting the nut 11 to be unscrewed to remove same from the bolt or to loosen same.

It will be seen from the foregoing description taken in connection with the accompanying drawings, that this invention provides for convenient, simple, inexpensive and efficient means for locking the nut at any position upon the bolt, and it is understood that this invention is susceptible of alterations in its details within the scope of the appended claims without departing from the spirit of the invention.

Having described the invention, what is claimed as new is:

1. In combination, a nut having a collar at one end with ratchet teeth in its periphery, a washer having a member engaging the collar, and a pawl carried by the washer to engage the ratchet teeth.

2. In combination, a nut having a collar at one end with ratchet teeth in its periphery, a washer having a member engaging the collar, a pawl carried by the washer to engage the ratchet teeth, and means carried by the washer and coöperating with the pawl to disengage same from the ratchet teeth.

3. In a device of the character described, a nut having a collar at its inner end with ratchet teeth in the periphery thereof, a washer having an undercut arcuate extension to be engaged by the collar, and a spring pawl secured to one end of the extension to engage the ratchet teeth.

4. In a device of the character described, a nut having a collar at its inner end with ratchet teeth in the periphery thereof, a washer having an undercut arcuate extension to be engaged by the collar, a spring pawl secured to one end of the extension to engage the ratchet teeth, and an eccentric pivoted to the washer and coöperating with the spring pawl to disengage the pawl from the ratchet teeth.

5. In combination, a bolt having a longitudinal channel therein, a nut thereon having a collar at its inner end with ratchet teeth in the periphery thereof, a washer coöperating with the nut and having an undercut arcuate extension engaged by the collar and a lug engaging in said channel, and a spring pawl secured to one end of the extension to engage the ratchet teeth.

In testimony that I claim the foregoing as my own, I have hereto affixed my signature in the presence of two witnesses.

G. W. MARTIN.

Witnesses:
C. H. HANBURY,
S. M. DOWLEN.

Copies of this patent may be obtained for five cents each, by addressing the " Commissioner of Patents, Washington, D. C."